(12) United States Patent
Cheung

(10) Patent No.: US 9,612,452 B2
(45) Date of Patent: Apr. 4, 2017

(54) WAVY STRUCTURE OF SPECTACLE FRAME

(71) Applicant: PLUS EYEWEAR LIMITED, Hong Kong (CN)

(72) Inventor: Kam Pui Jack Cheung, Hong Kong (CN)

(73) Assignee: Plus Eyewear Limited, Hong Kong (CN)

(*) Notice: Subject to any disclaimer, the term of this patent is extended or adjusted under 35 U.S.C. 154(b) by 0 days.

(21) Appl. No.: 14/780,271

(22) PCT Filed: Nov. 7, 2014

(86) PCT No.: PCT/CN2014/090601
§ 371 (c)(1),
(2) Date: Sep. 25, 2015

(87) PCT Pub. No.: WO2015/074497
PCT Pub. Date: May 28, 2015

(65) Prior Publication Data
US 2016/0048034 A1 Feb. 18, 2016

(30) Foreign Application Priority Data

Nov. 21, 2013 (CN) .......................... 2013 1 0603182

(51) Int. Cl.
*G02C 1/04* (2006.01)
*G02C 1/00* (2006.01)
(Continued)

(52) U.S. Cl.
CPC ................. *G02C 1/10* (2013.01); *G02C 1/04* (2013.01); *G02C 1/06* (2013.01); *G02C 5/008* (2013.01);
(Continued)

(58) Field of Classification Search
CPC ......... G02C 2200/10; G02C 1/04; G02C 5/16
(Continued)

(56) References Cited

U.S. PATENT DOCUMENTS 4,380,379 A * 4/1983 Ahern ...................... G02C 1/04
351/106
4,464,025 A * 8/1984 Lhospice ................. G02C 1/04
351/106
(Continued)

FOREIGN PATENT DOCUMENTS

CN 101623812 1/2010
CN 202453589 9/2012
(Continued)

*Primary Examiner* — Hung Dang
(74) *Attorney, Agent, or Firm* — Muncy, Geissler, Olds & Lowe, P.C.

(57) ABSTRACT

The present invention relates to a wavy structure of a spectacle frame, and the technical object of the present invention is to provide a wavy structure of a spectacle frame which is compatible to multiple different lenses, is convenient to install, and is firm and stable when in use. The wavy structure of the present invention includes a spectacle lens frame and frame temple, and an inner ring of the spectacle lens frame is shaped as a wavy structure. The present invention not only has elasticity and can be compatible to lens of different models, but also can firmly stabilize the lens, and is applied to the production and use of man-rated spectacle field.

6 Claims, 1 Drawing Sheet

(51) Int. Cl.
*G02C 1/06* (2006.01)
*G02C 5/00* (2006.01)
(52) U.S. Cl.
CPC ..... *G02C 2200/12* (2013.01); *G02C 2200/20* (2013.01); *G02C 2200/24* (2013.01)
(58) Field of Classification Search
USPC ............... 351/106, 103, 104, 96, 92, 90, 93
See application file for complete search history.

(56) References Cited

U.S. PATENT DOCUMENTS

| | | | | |
|---|---|---|---|---|
| 4,527,871 | A | * | 7/1985 | Sohyer ................. G02C 1/04 351/106 |
| 5,760,866 | A | * | 6/1998 | Wedeck ................. G02C 1/08 351/90 |
| 5,914,768 | A | * | 6/1999 | Hyoi ................. G02C 1/08 351/103 |
| 6,099,119 | A | * | 8/2000 | Kim ................. G02C 1/04 351/103 |

FOREIGN PATENT DOCUMENTS

| | | |
|---|---|---|
| CN | 203287626 | 11/2013 |
| CN | 203643693 | 6/2014 |
| JP | 5694321 | 7/1981 |
| JP | 2005107396 | 4/2005 |

\* cited by examiner

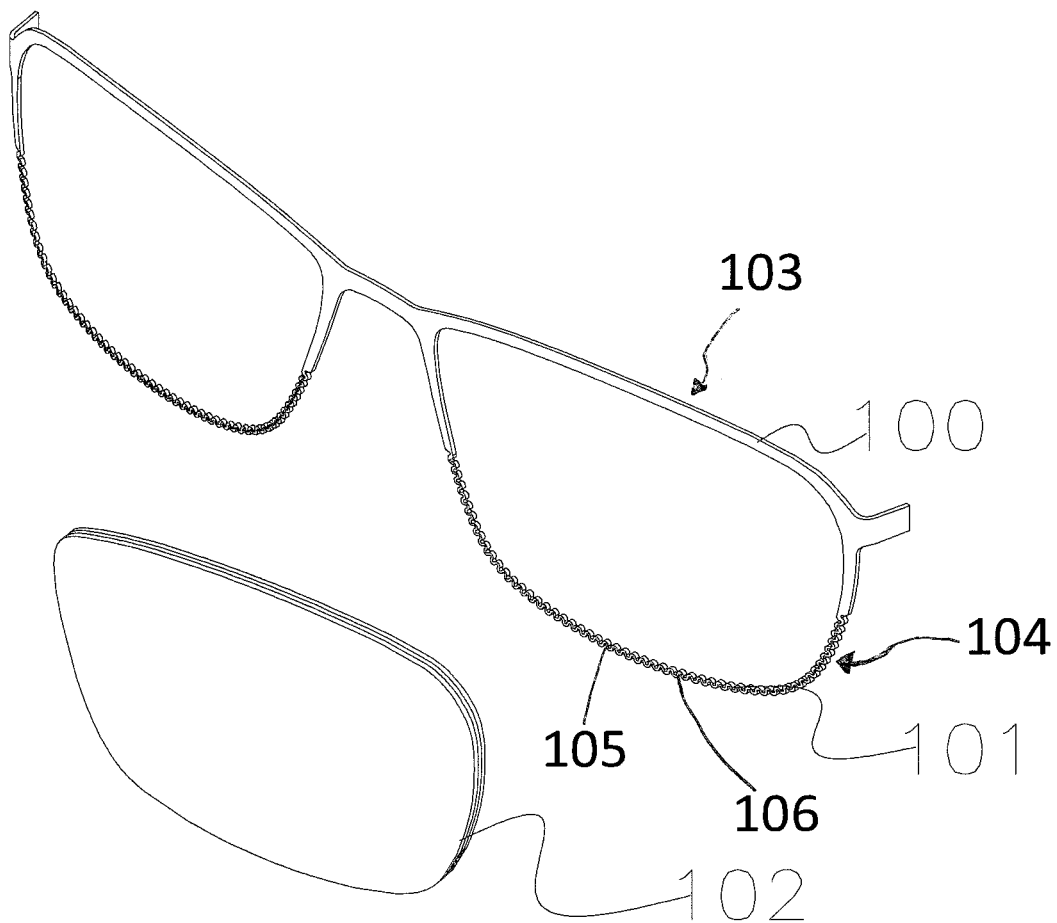

WAVY STRUCTURE OF SPECTACLE FRAME

TECHNICAL FIELD OF THE INVENTION

The present invention relates to a spectacle frame, and more particularly, to a wavy structure of a spectacle frame.

BACKGROUND OF THE INVENTION

In prior art, the spectacle lens frame of a spectacle frame plays roles on the lens on two aspects; on one hand, it plays a role of fixing, and on the other hand, it has certain elasticity to the lens, so as to facilitate installation of the lens. Most spectacle frame structures in prior art employ elastic line fixing or clamping hook fixing, which are more complicated ring assembling, have backward manufacturing ring technologies, and cannot satisfy the multiformity on lens shapes. The technical defects existing in the spectacle frame in prior art become a technical problem needing to be urgently solved by those skilled in the art.

SUMMARY OF THE INVENTION

The object of the present invention is to overcome the technical problems of single selectivity on the lens and backward fixing and installing structure of a spectacle frame in prior art, and provide a wavy structure of a spectacle frame which is compatible to multiple lenses of different models, is convenient to install, and is firm and stable when in use.

Specifically, a wavy structure of a spectacle frame comprise a spectacle lens frame and frame temple, and an inner ring of the spectacle lens frame is shaped as a wavy structure.

According to one embodiment of the invention, a contact section between the wavy structure of the inner ring of the spectacle lens frame and the spectacle lens is a Y-shaped split clamping structure. Further, the wavy structure of the inner ring is provided with anti-skid grains. And further, the wavy structure of the inner ring is a part of the circumference of the frame.

According to another embodiment of the invention, the inside of the spectacle lens frame is provided with a lens, and a corresponding section between the lens and the wavy structure of the inner ring is provided with a groove. Further, the wavy structure of the inner ring of the spectacle lens frame is manufactured by wire cutting.

The present invention has the advantageous technical effects that: when in application, the present invention not only has elasticity and is compatible to multiple lenses of similar models, but also can firmly stabilize the lenses, is convenient and durable due to the metal characters of the inner ring in the wavy structure. Moreover, the present invention has simple structure, is designed skillfully, has low cost, and is easy to implement.

BRIEF DESCRIPTION OF THE DRAWINGS

The FIGURE is a schematic view of an embodiment of the present invention.

DETAILED DESCRIPTION OF THE INVENTION

The specific implementation of the present invention in described in details below with reference to the FIGURE, but no limitation is made to the claims.

A spectacle frame according to the present invention includes a spectacle lens frame 100 and frame temple. The spectacle lens frame 100 has an upper frame portion 103 and a lower frame portion 104, the upper frame portion 103 and the lower frame portion 104 connect together to form an inner ring to contact and clamp a spectacle lens 102, the lower frame portion 104 includes a plurality of wave points 105 arranged in series and a plurality of extensible legs 106 and is shaped as a wavy structure 101, and each of the plurality of extensible legs 106 connects two of the plurality of wave points 105 so as to change a distance between the two of the plurality of wave points 105. Specifically, a contact section between the wavy structure 101 of the inner ring of the spectacle lens frame 100 and the spectacle lens is a Y-shaped split clamping structure. Moreover, a single-layer split structure can be formed; that is, the wavy structure 101 only has one wavy line, the wave points of two adjacent waves incline towards opposite directions respectively to clamp the lower portion of the lens. Further, a double-layer split structure may also be formed; that is, the wave point of each wavy line is provided with a Y-shaped groove to clamp the lower portion of the lens. The wavy structure of the inner ring is provided with anti-skid grains to prevent the lens form skidding. The wavy structure of the inner ring can be configured to form a part of the circumference of the frame. The inside of the spectacle lens frame is provided with a lens 102, and a corresponding section between the lens 102 and the wavy structure 101 of the inner ring is provided with a groove. The wavy structure 101 of the inner ring of the spectacle lens frame is manufactured in a manner of wire cutting. During implementation of the invention, the lens 102 may also be replaced by any installing structure that is installed with a lens.

The present invention not only has elasticity and is compatible to multiple lenses of similar models, but also can firmly stabilize the lenses, is convenient and durable, due to the metal characters of the inner ring in the wavy structure. Compared with the prior art, the present invention has outstanding substantive features and may represent notable technical progress.

The invention claimed is:

1. A spectacle frame comprising a spectacle lens frame and a frame temple, wherein the spectacle lens frame has an upper frame portion and a lower frame portion, the upper frame portion and the lower frame portion connect together to form an inner ring to contact and clamp a spectacle lens, the lower frame portion includes a plurality of wave points arranged in series and a plurality of extensible legs and is shaped as a wavy structure, and each of the plurality of extensible legs connects two of the plurality of wave points so as to change a distance between the two of the plurality of wave points.

2. The spectacle frame according to claim 1, wherein a contact section between the wavy structure of the inner ring of the spectacle lens frame and the spectacle lens is a Y-shaped split clamping structure.

3. The spectacle frame according to claim 1, wherein the wavy structure of the inner ring is provided with anti-skid grains.

4. The spectacle frame according to claim 1, wherein the wavy structure of the inner ring is a part of the circumference of the spectacle frame.

5. The spectacle frame according to claim 1, wherein the inside of the spectacle lens frame is provided with a lens, and a corresponding section between the lens and the wavy structure of the inner ring is provided with a groove.

6. The spectacle frame according to claim 4, wherein the wavy structure of the inner ring of the spectacle lens frame is manufactured by wire cutting.

\* \* \* \* \*